United States Patent [19]

Gijsman

[11] Patent Number: 5,157,064

[45] Date of Patent: Oct. 20, 1992

[54] STABILIZED POLYAMIDE 4.6 COMPOSITIONS

[75] Inventor: Pieter Gijsman, Beek, Netherlands

[73] Assignee: Stamicarbon B.V., Geleen, Netherlands

[21] Appl. No.: 499,588

[22] Filed: Mar. 27, 1990

[30] Foreign Application Priority Data

Mar. 28, 1989 [NL] Netherlands .................... 8900746

[51] Int. Cl.$^5$ ........................... C08K 5/15; C08K 5/03
[52] U.S. Cl. ................................... 524/114; 524/413; 524/469; 524/606
[58] Field of Search ............ 524/114, 413, 467, 469, 524/606, 414

[56] References Cited

U.S. PATENT DOCUMENTS

| | | | |
|---|---|---|---|
| 2,705,227 | 3/1955 | Stamatoff | 523/307 |
| 3,174,944 | 3/1965 | Brandes | 524/606 |
| 3,318,827 | 5/1967 | Whittaker | 524/413 |
| 3,418,267 | 12/1968 | Busse | 524/606 |
| 3,491,042 | 1/1970 | Hermann et al. | 524/413 |
| 3,519,595 | 7/1970 | Hermann et al. | 524/606 |
| 3,629,174 | 12/1971 | Siclari et al. | 524/413 |
| 4,137,212 | 1/1979 | Theysohn et al. | 524/412 |
| 4,548,972 | 10/1985 | Williams | 524/467 |

FOREIGN PATENT DOCUMENTS 1184945 1/1965 Fed. Rep. of Germany .
6411752 4/1965 Netherlands .

*Primary Examiner*—Veronica P. Hoke
*Attorney, Agent, or Firm*—Cushman, Darby & Cushman

[57] ABSTRACT

The invention relates to a stabilized polyamide 4.6 composition, which includes copper in the form of a water insoluble copper salt and a halogen-substituted organic compound.

2 Claims, No Drawings

STABILIZED POLYAMIDE 4.6 COMPOSITIONS

BACKGROUND AND SUMMARY OF THE INVENTION

The present invention relates to polyamide compositions and in particular to copper-stabilized polyamide 4.6 compositions. The use of copper compounds, in particular copper salts, such as copper halides, as a stabilizer of polyamides is known. JP-A-86-289660 points out the particular effect of the presence of potassium iodide in addition to the copper salt, copper iodide, giving very good thermal stability of polyamide 4.6 for a very long time. The use of copper iodide alone only provides a marginal improvement of the thermal stability. In the case of polyamide 4.6 used in for instance in electric and electronic equipment, however, the presence of free potassium iodide is prohibited because of the high risk of corrosion and frequently too high electrical conductivity of the material.

The most obvious solution for stabilizers of polyamide 4.6 compositions in electrical/ electronic applications consequently lies in the use of non-ionic organic compounds having a stabilizing effect.

However, an extensive examination of the commercially available stabilizers and stabilizer combinations did not yield an organic non-ionic stabilizer meeting the high stability requirements at the elevated temperatures that are necessary for many electronic/electric applications.

Very surprising, it is now found that a combination of a water insoluble copper salt in a very low concentration with a halogen-substituted organic compound has an unexpectedly strong stabilizing effect in polyamide 4.6 compositions.

DETAILED DESCRIPTION OF THE INVENTION

Embodiments of the present invention include compositions comprising 1) polyamide 4.6; 2) copper present in the form of a water insoluble copper salt; and 3) a halogen substituted organic compound. For example, the polyamide 4.6 composition according to the present invention may include, per 100 parts by weight of polyamide 4.6, (a) 0.001-0.2 parts by weight of copper in the form of a water insoluble copper salt, and (b) 0.1-25 parts by weight of a halogen-substituted organic compound.

The insoluble copper salts preferably contain monovalent copper, Cu (I); Cu(I) iodide appearing to be very suitable, for example. The halogen-substituted organic compound is in principle any compound covered by this definition. For practical reasons, processability and safety, preference is given to compounds which are stable and have little volatility at the processing temperature of polyamide 4.6, i.e. 300°-330° C. Such compounds are in general of high-molecular weight and/or have a high halogen content; particularly suitable are halogen-substituted epoxy and styrene oligomers or polymers. These compounds are particularly suitable if they have a high bromine content. In that case there exists the special advantage that the composition is also flameproof. It should be noted that it is very surprising that bromine-containing compounds have a synergistic effect in combination with a Cu(I) iodide to stabilize polyamide 4.6.

Examples of such bromine-containing high-molecular weight styrene and epoxy compounds are commercially available under different names. Example: Pyrocheck 68 PB (a bromated polystyrene compound) from the firm of Makhteshim and Makhteshim F2400 (a bromated epoxystyrene compound) from the firm of Makhteshim.

Due to the very low Cu(I) iodide content of the composition, at least 0.001 parts by weight of copper per 100 parts by weight of polyamide is required in order to obtain a significant effect, with a maximum of up to 0.2 parts by weight. At higher concentrations no further improvement of the stabilization occurs; the electrical conductivity of the composition remains within the applicable standards. A measure for the electrical conductivity is the "dissipation factor", according to the international standard, IEC 250. A dissipation factor range of 0.05-5 generally exists with a dissipation factor greater than 0.3 being usually too high for electric/electronic applications. By preference the Cu(I) iodide concentration is between 0.003 and 0.1 part copper by weight per 100 parts by weight of polyamide 4.6.

Component (b) is an organic non-ionic stabilizer which together with component (a) results in a stabilized polyamide 4.6 composition having acceptably low electric conductivity.

The concentration of component (b), a halogen-substituted organic compound, in the composition can vary between wide limits. In order to obtain some effect, at least 0.1 part by weight per 100 parts by weight of polyamide is present. The upper limit of component (b) is about 25 parts by weight because when more than 25 parts by weight of component (b) is present, no further improvement of stability is achieved and the mechanical properties of the composition are adversely affected. In particular, if compounds with flame-retardant properties are used, the concentration of (b) is in part chosen on the basis of the effect thereof. Preferably, the concentration of (b) in the composition is between 0.5 and 15 parts by weight of (b) per 100 parts by weight of polyamide 4.6.

By the term "polyamide 4.6'"" it is understood in the context of the present invention to be a polyamide which is substantially composed of tetramethylene adipamide units being present in an amount of 50% to about 100%, and preferably, 80% to about 100%. Besides the tetramethylene adipamide units the polyamide may contain other polyamide-building units, such as caproamide, dicarboxylic- and diamine-derived units, polyester- and polyimide-building units.

The polyamide 4.6 composition may further contain the usual additives and fillers, for instance release agents, pigments and colorants, reinforcing fiber materials, lubricants and other polymers. Other polymers are for instance polystyrene, polyacrylate, polyarylate, polyolefine, polyester, polyether and polysulphon, other polyamides and thermosetting resins, for instance phenol resins and melamine.

The composition according to the invention can be prepared using the customary techniques of melt mixing and dry blending. Known apparatus used for this are for instance extruders and Banberry blenders. Preferably the mixing is done in an inert gas atmosphere. Using customary techniques, the composition according to the invention can be processed from the melt into objects, for instance by means of injection molding, extruding and/or compression molding.

The present invention will now be elucidated with the following examples and comparative examples, without however being restricted thereto.

EXAMPLES AND COMPARATIVE EXAMPLES

Tests of thermal stability were performed on examples of compositions of the present invention i.e. Examples I–IV, and comparative examples of conventional compositions i.e. Comparative Examples A–K. The results of the tests demonstrate new and unexpectedly high thermal stability of the Example compositions of the present invention.

The ingredients and preparations of ingredients for all Example and Comparative Example compositions are listed in Table 1, below. The composition wt.% set forth in Table 1 for each Example and Comparative Example is based upon parts by weight per 100 parts by weight of polyamide 4.6.

Example I is directly comparable to Comparative Example A, Example II with Comparative Example B, Example III with Comparative Example C and Example IV with Comparative Example D, the only difference being the addition of "component (b)" of the present invention, for example, P-68PB, a bromated polystyrene.

Inclusion of the Comparative Example E composition is to show results of only adding the P-68PB to polyamide 4.6 without "component (a)", for example CuI, of the present invention.

The compositions of Comparative Examples F–K represent conventional components added to polyamide 4.6 for increased thermal stability.

In all Examples and Comparative Examples the compositions were prepared using a ZSK 30 Werner and Pfleiderer twin-screw extruder, with the temperature set at 300° C.

Injection-molded test bars were made from the compositions at a melt temperature of 315° C. and mold temperature of 80° C. Test bars were made according to DIN 53455/4 international standard. These test bars were subjected to ageing tests by exposure to atmospheric conditions at elevated temperature, 150° C., in an air oven. This provides a good test of thermal stability.

The tensile strength according to ISO-R 527/2 international standard was determined as a function of the exposure time.

The time elapsed until the tensile strength of the bars had diminished to half the initial value is shown in Table 1 for each of the compositions examined. The abbreviations used in Table 1 are defined below:

CuI: Copper iodide, chem. pure
KJ: Potassium iodide, chem. pure
Irg. 1098: Irganox 1098, N,N'-hexamethylene bis(3,5-ditert-butyl-4-hydroxy hydrocinnamic amide) from CIBA-GEIGY, Switzerland
PEPQ: Irgafos P-EPQ, a tetrakis-(2,4-ditert.butylphenyl)-4,4'-biphenylene-diphosphonite from CIBA-GEIGY, Switzerland
Perm. DPPD: Permanax DPPD, N,N'-diphenyl-paraphenylene diamine, from Vulnax International Ltd., UK
P-68PB: Pyrocheck 68PB, a bromated polystyrene compound, from Makhteshim, Israel
PA 4.6: Polyamide 4.6, from DSM, Netherlands, Stanyl ®300 tetramethyleneadipamide-polymer, with a characteristic, indicated intrinsic viscosity ( ) of 3.4.

TABLE 1

Examples I–IV (Present Invention) and Comparative Examples A–K

| Composition* (wt. %) | Half-strength time at 150° C. (hours) |
|---|---|
| I. 0.0075 CuI (wt. % Cu) + 15 P-68PB | 2400 |
| II. 0.0150 CuI (wt. % Cu) + 15 P-68PB | 2400 |
| III. 0.030 CuI (wt. % Cu) + 15 P-68PB | 2500 |
| IV. 0.030 CuI (wt. % Cu) + 0.24 KI (wt. % I) + 20 P-68PB | 4000** |
| A. 0.0075 CuI (wt. % Cu) | 750 |
| B. 0.0150 CuI (wt. % Cu) | 1200 |
| C. 0.030 CuI (wt. % Cu) | 1200 |
| D. 0.030 CuI + 0.24 KI (wt. % I) | 3000** |
| E. — 15 P-68PB | 220 |
| F. 1.0 Irg 1098 | 750 |
| G. 1.0 Irg 1098 + 10 P-68PB | 700 |
| H. 1.0 Perm DPPD | 750 |
| I. 1.0 Perm DPPD + 20 P-68PB | 900 |
| J. 0.4 Irg 1098 + 0.4 PEPQ | 750 |
| K. 0.4 Irg 1098 + 0.4 PEPQ + 20-68PB | 830 |

*Based upon parts by weight per 100 parts by weight of polyamide 4.6.
**Conductivity too high for electric/electronic applications (see Table 2 for measurements)

The above test results show thermal stability of the compositions as measured by time elapsed until the tensile strength of the sample bars diminished to one half the initial value of tensile strength. The results of Examples I–III compared with the results of Comparative Examples A–C show the surprisingly clear superiority of having "Component (b)" i.e. P-68PB in compositions of the present invention. The advantage of the present compositions ranges from about 200% to about 330% better heat stability of the present compositions (I–III) compared to conventional compositions (A–C).

In Example IV, compared with Comparative Example D, the presence of "compound b" increases the thermal stability of the composition but the KI results in unacceptably high electrical conductivity.

As previously stated, the measure for electrical conductivity is the "dissipation factor", according to IEC 250. When an alternating field is applied to a polymer material the energy recovered demonstrates a phase difference to the applied field and also a reduced amplitude. The lost energy is then dissipated as heat in the material. The dissipation factor is the ratio of the dissipated energy to the recovered energy. A dissipation factor range of 0.01–5 generally exists.

The dissipation factor for the coapositions of Example III and IV, and Comparative Examples D and F, were measured at a frequence of 1 MHz and a temperature of 23° C. The samples were conditioned according to international standard ISO 1110, accelerated method, at 70° C. and in 62% relative humidity.

The results are shown in below Table 2.

TABLE 2

Measurement of Dissipation Factors for Selected Compositions

| | |
|---|---|
| Example III: | Dissipation factor = 0.22 |
| Example IV: | Dissipation factor = 0.33 |
| Comp. Example D: | Dissipation factor = 0.35 |
| Comp. Example F: | Dissipation factor = 0.21 |

A dissipation factor greater than 0.3 is too high for electric/electronic applications. Thus the electrical conductivity for Example IV and Comparative Example D is too high.

The compositions of Comparative Examples F–K show that conventional components to increase stability of polyamide 4.6 result in thermal stability far inferior to that of the present compositions.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A stabilized polyamide 4.6 composition comprising:
   a) polyamide 4.6;
   b) 0.001-0.2 parts by weight of a water insoluble copper salt per 100 parts by weight polyamide 4.6; and
   c) 0.1-25 parts by weight of a brominated epoxy or brominated styrene oligomer or polymer.
2. Composition according to claim 1 wherein the copper salt is Cu(I) iodide.

* * * * *